T. P. How.
Inkstand.
No. 26,992. Patented Jan. 31, 1860.

Witnesses.
Martin D. Landy
John Cumly

Inventor.
Thos P How

UNITED STATES PATENT OFFICE.

THOMAS P. HOW, OF NEW YORK, N. Y.

INKSTAND.

Specification of Letters Patent No. 26,992, dated January 31, 1860.

*To all whom it may concern:*

Be it known that I, THOMAS P. HOW, of New York, in the county of New York and State of New York, have invented a certain Improvement in Inkstands, the construction and operation of which I have described in the following specification and illustrated in its accompanying drawings with sufficient clearness to enable competent and skillful workmen in the arts to which it pertains or is most nearly allied to make and use my invention.

My said invention consists in the combination with a measuring cup or cylinder at the bottom of the inkstand, and of sufficient size to supply the dipping cup, but not so large as to fill it to overflowing, and with the piston attached to the lower end of the dipping cup of a device for closing the lower end of the tube through which the ink passes to the dipping cup, thereby allowing the piston to be sufficiently loose to slide freely in the measuring cup, while at the same time the requisite quantity of ink is securely retained in the dipping cup, and the measuring cup is thus made available for the supply of the dipping cup with a definite and properly limited supply of ink, as hereinafter more fully set forth.

Figure 2:
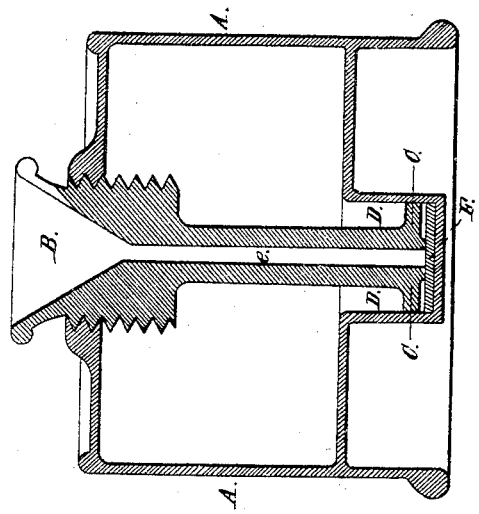
Figure 1:
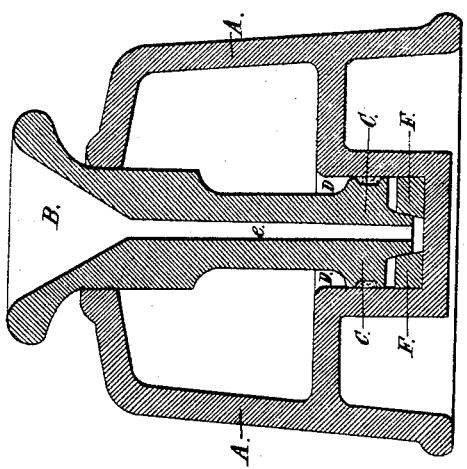

The accompanying drawings represent my invention as follows:

Figure 1, is a sectional elevation of an inkstand which embodies my improvement. It is intended to be made of glass or any other suitable material. Fig. 2, is also a sectional elevation, showing a modification of my invention. This last inkstand is intended to be made of hard rubber or some kind of metal.

A, A, are the sides of the inkstand.

B, is the dipping cup, the form and construction of which is shown with sufficient distinctness in the drawings, to render a lengthened description of it unnecessary. It is made in one piece with the piston C, which fits with tolerable accuracy into the measuring cup D, at the bottom of the inkstand. The tube $e$, forms a communication from the lower side of the piston C, to the dipping cup, through which tube the ink is forced up by the downward pressure of the piston after its end enters the measuring cup. The size of the measuring cup is such as to supply the proper amount of ink to the dipping cup, but it is not large enough to overflow it. It will be observed that the cup D, forms the lower portion of the receptacle for ink, and consequently that it will always furnish the requisite supply to the dipping cup as long as there is ink enough in the inkstand to fill it, and as only the ink contained in it and the lower part of the tube will be raised, the supply of ink to the dipping cup will not be materially varied by the amount of ink contained in the inkstand over and above enough to fill the measuring cup, and in no case can ink enough be raised to overflow the fountain.

To prevent the necessity of making and maintaining a perfectly tight joint between the piston and the sides of the measuring cup, I provide means for effectually closing the tube or cutting off its communication with the main body of the ink at the close of its descent to the bottom of the measuring cup, by which a slight leak in the packing of the piston is prevented from allowing the escape of the ink from the dipping cup after being raised into it.

In Fig. 1, in which the tube and piston is arranged so as to be simply slid down into place, a piece of elastic rubber F, is fitted snugly into the bottom of the measuring cup, and has an aperture in the center which will just admit the slightly conical end of the tube, as shown, by which arrangement, when the piston descends to its lowest position, the lower end of the tube is corked up or closed in a manner that is at once simple, cheap, effective and reliable, compensating with very great certainty for any defect that may exist in the fitting of the packing in the sides of the piston. In this case the piston is represented as being packed by winding a bit of yarn upon it, but in Fig. 2, in which the inkstand is supposed to be constructed of materials which allow a more accurate fitting of the parts, no packing is deemed necessary. The packing or fitting of the piston, need in no case be so snug as to interfere with its free and easy motion as the device for cutting off the communication at the bottom relieves the packing of the piston from duty as soon as the piston has completed its descent. In Fig. 2, the piston instead of being slid directly down as in Fig. 1, is carried down by means of a screw, which prevents any possibility of forcing it down so suddenly as to throw the ink out in a jet from the dipping cup by careless manipulation. It may be advisable to make this screw with a sharp lead, sufficient perhaps to give it the proper descent at a single revolution. In Fig. 2, the rubber F, is thin, and there is no hole in it, the piston is simply screwed down upon it. It is obvious that a different form of the device for closing the tube might be employed which would amount to the same thing, and accomplish the same result substantially in the same way, as for example, a small conical stopper made upon the bottom of the measuring cup to enter the tube at the close of its descent.

The particular improvement which I claim as constituting the said invention and originally and first invented by me, is—

The combination of the measuring cup by which the supply of ink to the fountain or dipping cup is accurately graduated with the piston and the device for closing the tube at the end of the stroke, substantially as and for the purposes set forth.

THOS. P. HOW.

Witnesses:
MARTIN D. LANDY,
JOHN CRUMLY.